US009571786B1

(12) United States Patent
Zimmer et al.

(10) Patent No.: US 9,571,786 B1
(45) Date of Patent: Feb. 14, 2017

(54) SYSTEMS AND METHODS FOR INTERPOLATING FRAMES OF A VIDEO (71) Applicants: Disney Enterprises, Inc., Burbank, CA (US); ETH Zürich, Zürich (CH)

(72) Inventors: Henning Zimmer, Burbank, CA (US); Alexander Sorkine Hornung, Zürich (CH); Simone Meyer, Zürich (CH); Max Grosse, Zürich (CH); Oliver Wang, Zürich (CH)

(73) Assignees: ETH ZURICH, Zurich (CH); DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 14/884,046

(22) Filed: Oct. 15, 2015

(51) Int. Cl.
H04N 7/01 (2006.01)
H04N 5/91 (2006.01)

(52) U.S. Cl.
CPC .............. H04N 7/0135 (2013.01); H04N 5/91 (2013.01)

(58) Field of Classification Search
USPC ......................................... 348/448, 441–447
See application file for complete search history.

(56) References Cited

U.S. PATENT DOCUMENTS

| 5,751,243 | A  | * | 5/1998  | Turpin  | G01S 7/20 250/370.08 |
| 6,788,347 | B1 | * | 9/2004  | Kim     | G06T 1/60 348/441 |
| 7,643,681 | B2 | * | 1/2010  | Nakasone | H04N 1/60 345/600 |
| 2002/0087910 | A1 | * | 7/2002 | McEwen | G11B 20/10296 713/503 |
| 2009/0279807 | A1 | * | 11/2009 | Kanamorl | G02B 5/3025 382/274 |
| 2010/0253820 | A1 | * | 10/2010 | Kanamori | H01L 27/14621 348/280 |
| 2013/0144614 | A1 | * | 6/2013 | Myllyla | G10L 19/0208 704/210 |

* cited by examiner

Primary Examiner — Paulos M Natnael
(74) Attorney, Agent, or Firm — Sheppard Mullin Richter & Hampton LLP (57) ABSTRACT Interpolating frames of a video may provide a technique for one or more of frame rate conversion, temporal upsampling for generating slow motion video, image morphing, virtual view synthesis, and/or other video applications. A system may be configured to interpolated frames of a video by leveraging frequency domain representations of individual frames. The frequency domain representations may be decomposed into set of discrete functions that make up the frequency domain representations. Corresponding functions from sets of functions associated with frames with which an interpolated frame is to be determined may be identified. Phase differences between corresponding functions may be determined. Interpolated functions between the corresponding functions may be determined based on the determined phased differences. Information describing spatial domain representations of interpolated frames may be determined based on the interpolated functions.

20 Claims, 5 Drawing Sheets

SYSTEMS AND METHODS FOR INTERPOLATING FRAMES OF A VIDEO

FIELD OF THE DISCLOSURE

This disclosure relates to interpolating frames of a video.

BACKGROUND

Computing interpolated frames (also referred to as "in-between" frames) of a video is a task that may be carried out during some types of image and/or video processing. Interpolating frames may be a step in numerous applications such as frame rate conversion (e.g., between broadcast standards), temporal upsampling for generating slow motion video, image morphing, virtual view synthesis, and/or other applications. Some solutions to frame interpolation may include computing pixel correspondences (e.g., by leveraging optical flow, stereo, and/or other methods), correspondence-based image warping, and/or other techniques. Due to inherent ambiguities in computing correspondences, some methods may be heavily dependent on a computationally expensive global optimization and/or may require considerable parameter tuning.

With today's trend in the movie and broadcasting industry toward higher resolution and higher frame rate video (e.g., cameras may support 4k resolution at 120 frames per second and beyond), there may be a need for interpolation techniques that may deal efficiently with this considerably larger data volume. Standard optical flow techniques based on global optimization may become inefficient for interpolating this type of large-scale, densely sampled video.

SUMMARY

One aspect of the disclosure relates to a system for interpolating frames of a video. Some approaches to computing interpolated (e.g., "in-between") frames in a video sequence may require accurate pixel correspondences between images using, for example, optical flow and/or other techniques. One or more implementations of the system presented herein may be configured to provide an efficient alternative by leveraging frequency domain representations of frames of a given video that may represent motion in the video as a "phase shift" of corresponding decomposed elements of the frequency domain representations. This technique may allow frames to be interpolated at a fraction of the computational cost of optical flow-based solutions, while achieving similar if not superior results. One or more implementations of the system may be especially well suited for frame interpolation and/or retiming of high resolution, high frame rate video.

In some implementations, the system may include one or more physical processors that are configured by machine-readable instructions. Executing the machine-readable instructions may cause the one or more physical processors to interpolate frames of a video. The machine-readable instructions may include one or more of a video component, a decomposition component, a phase difference component, a function interpolation component, a frame interpolation component, a presentation component, and/or other components.

The video component may be configured to obtain information associated with one or more videos. The information associated with a given video may describe spatial domain representations of individual frames of the given video. By way of non-limiting example, frames of a given video may include a first frame, a second frame, and/or other frames. Individual ones of the frames may be described by spatial domain representations. By way of non-limiting example, a spatial domain representation may comprise a RGB color space representation, Lab color space representation, and/or other spatial domain representations of a given frame.

In some implementations, the decomposition component may be configured to determine frequency domain representations of individual frames of a given video from the information describing spatial domain representations of the frames of the given video, decompose the frequency domain representations into sets of constituent functions, and/or perform more or fewer operations. In some implementations, a frequency domain representation may be determined based on a transform of the spatial domain representations of the individual frames. A frequency domain representation of a given frame may comprise one or more of a Fourier series, a sinusoidal function, a wavelet, and/or other frequency domain representations. By way of non-limiting example, a Fourier transform, wavelet transform, and/or other transforms may be used to determine frequency domain representations of individual frames of a given video based on spatial domain representations.

By way of non-limiting example, a first frequency domain representation of the first frame may be determined from the information describing the spatial domain representation of the first frame. A second frequency domain representation of the second frame may be determined from the information describing the spatial domain representation of the second frame. Other frequency domain representations of other frames of the given video may be determined from the information describing spatial domain representations of the other frames obtained by the video component.

The decomposition component may be configured to decompose frequency domain representations of individual frames into sets of functions that make up the frequency domain representations. By way of non-limiting example, the decomposition component may be configured to decompose one or more of the first frequency domain representation into a first set of sinusoidal functions, the second frequency domain representation into a second set of sinusoidal functions, and/or other frequency domain representations of other frames of the video into other sets of functions. In some implementations, the first set may include a first sinusoidal function and/or other functions. In some implementations, the second set may include a second sinusoidal function and/or other functions. In some implementations, individual sinusoidal functions may comprise wavelets and/or other oscillatory functions.

In some implementations, the phase difference component may be configured to identify corresponding sinusoidal functions from the first set, second set, and/or other sets; determine phase differences between corresponding sinusoidal functions; and/or perform more or fewer operations. In some implementations, identifying corresponding sinusoidal functions may comprise identifying sinusoidal functions that share one or more similar aspects of their functions. Shared aspects may include one or more of frequency, amplitude, phase, and/or other shared aspects of the functions. By way of non-limiting example, the phase difference component may be configured such that the first sinusoidal function may be identified as corresponding to the second sinusoidal function.

In some implementations, the phase difference component may be configured to determine phase differences between corresponding sinusoidal functions and/or other information associated with corresponding sinusoidal functions. By way of non-limiting example, the phase difference component may be configured to determine a first phase difference between the first sinusoidal function and the second sinusoidal function, and/or other phase differences between other corresponding sinusoidal functions.

In some implementations, the function interpolation component may be configured to interpolate sinusoidal functions for the corresponding sinusoidal functions based on the determined phased differences of the corresponding sinusoidal functions, and/or other information. By way of non-limiting example, the function interpolation component may be configured to interpolate a third sinusoidal function for the first sinusoidal function and the second sinusoidal function based on the first phase difference and/or other information. The function interpolation component may be configured to interpolate other sinusoidal functions.

In some implementations, the frame interpolation component may be configured to determine information describing spatial domain representations of interpolated frames based on the interpolated sinusoidal functions. By way of non-limiting example, the frame interpolation component may be configured such that information describing a spatial domain representation of a third frame may be determined based on the third sinusoidal function and/or other interpolated sinusoidal function. In some implementations, the third frame may correspond to an interpolated frame between the first frame and the second frame. The video component may be configured to update the information describing the spatial domain representations of the frames in the given video to include the determined information corresponding to one or more interpolated frames.

The presentation component may be configured to effectuate presentation of the given video based on the updated information describing spatial domain representations of the frames of the video. By way of non-limiting example, the updated information may represent a relatively higher frame rate version of the given video compared to the information initially obtained by the video component.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
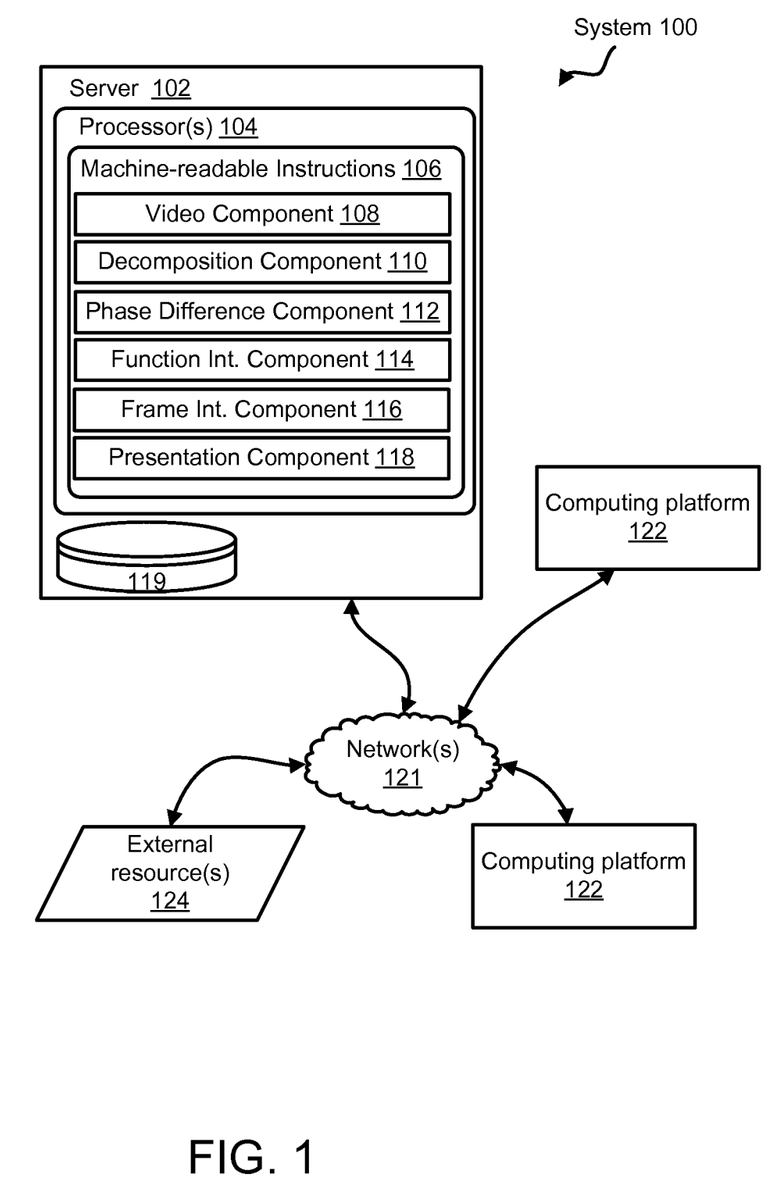
FIG. 1 illustrates a system configured for interpolating frames of a video, in accordance with one or more implementations.

FIG. 1 illustrates a system 100 configured for interpolating frames of a video, in accordance with one or more implementations. A video may comprise a series of still images that may be presented in rapid succession to cause an appearance of movement of object, actors, and/or other elements portrayed in the images. A given image may correspond to a given frame of the video. A video may have multiple frames, a sound track, and/or other components. A video may be a recorded video, a live video feed, and/or other audiovisual asset.

In some implementations, the system 100 may comprise a server 102, one or more computing platforms 122, and/or other components. The server 102 may include one or more physical processors 104 configured by machine-readable instructions 106. Executing the machine-readable instructions 106 may cause the one or more physical processors 104 to facilitate interpolating frames of a video. The machine-readable instructions 106 may include one or more of a video component 108, a decomposition component 110, a phase difference component 112, a function interpolation component 114 (abbreviated "Function Int. Component 114" in FIG. 1), a frame interpolation component 116 (abbreviate "Frame Int. Component 116" in FIG. 1), a presentation component 118, and/or other components.

In some implementations, the server 102 may be configured to provide remote hosting of the features and/or functions of the machine-readable instructions 106 to one or more computing platforms 122 that may be remotely located from the server 102. In some implementations, one or more features and/or functions of server 102 may be attributed as features and/or functions that are local to one or more computing platforms 122. By way of non-limiting example, individual ones of the computing platforms 122 may include machine-readable instructions comprising the same or similar components as machine-readable instructions 106 of server 102. The computing platforms 122 may be configured to locally execute one or more components of the machine-readable instructions 106.

The computing platforms 122 may include one or more of a cellular telephone, a smartphone, a laptop, a tablet computer, a desktop computer, a television set-top box, smart TV, a gaming console, and/or other computing platform.

In some implementations, the video component 108 may be configured to obtain information associated with one or more videos. The information associated with a given video may describe spatial domain representations of individual frames of the given video. Individual ones of the frames may be described by spatial domain representations of the individual frames. By way of non-limiting example, a spatial domain representation may comprise a RGB color space representation, Lab color space representation, and/or other spatial domain representations of a given frame. In some implementations, the video component 108 may be configured to obtain information from one or more computing platforms 122, one or more storage locations (e.g., electronic storage 119, an external resource 124, and/or other storage location), and/or from other sources of information associated with one or more videos.

Figure 2:
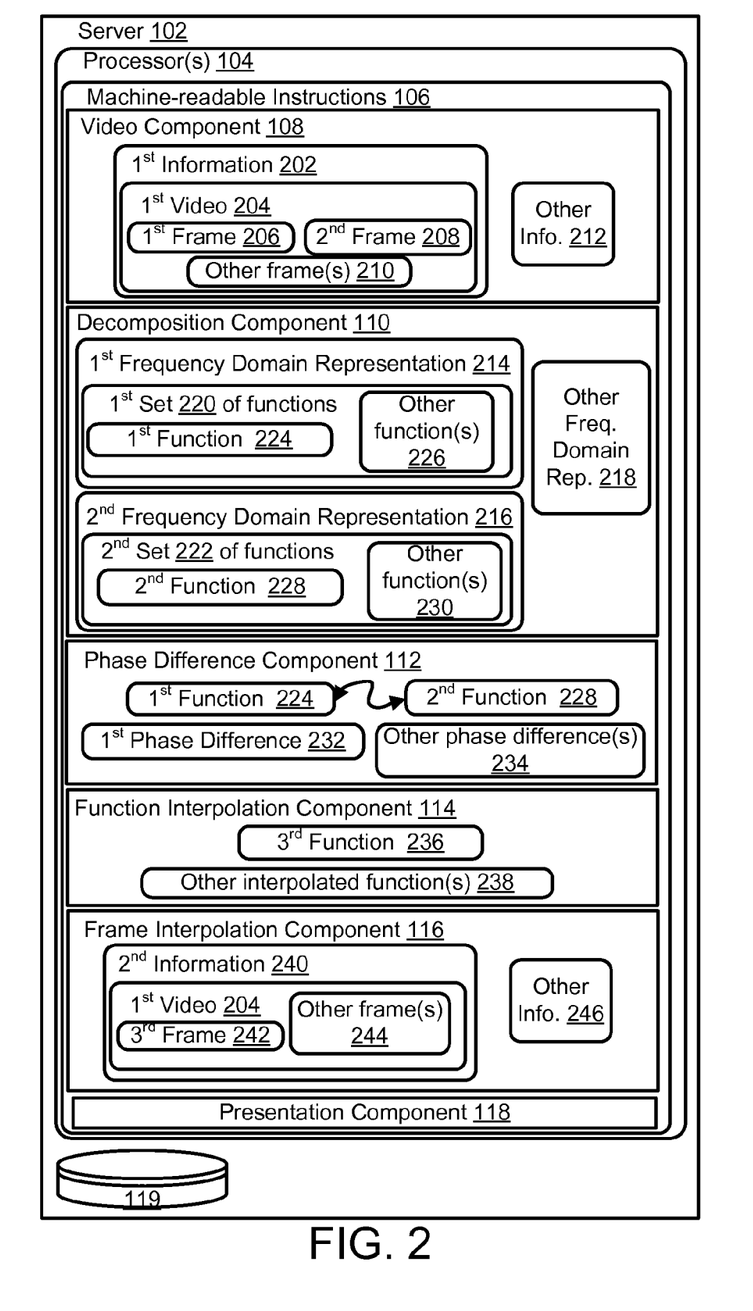
FIG. 2 illustrates an implementation of a server employed in the system of FIG. 1.

By way of non-limiting illustration in FIG. 2, the video component 108 may be configured to obtain first information 202 associated with a first video 204 and/or other information 212 associated with one or more other videos. The first information 202 may describe spatial domain representations of frames of the first video 204. For example, the first information 202 may describe spatial domain representations a first frame 206, a second frame 208, and/or other frames 210 of the first video 204.

Returning to FIG. 1, in some implementations, the decomposition component 110 may be configured to do one or more of determine frequency domain representations of individual frames of a given video from the information describing spatial domain representations of the frames of the given video; decompose the frequency domain representations into sets of functions; and/or more or less operations. In some implementations, a frequency domain representation may be determined based on a transform of the spatial domain representations of the individual frames and/or other techniques. A frequency domain representation of a given frame may comprise one or more of a Fourier series, a sinusoidal function, a wavelet, an oscillatory function, and/or other representation. By way of non-limiting example, a Fourier transform, wavelet transform, and/or other transforms may be used to determine frequency domain representations of individual frames of a given video based on the spatial domain representations of the frames.

In some implementations, the decomposition component 110 may be configured to decompose frequency domain representations of individual frames into sets of functions that make up the frequency domain representations. By way of non-limiting example, the frequency domain representations may correspond to a sum of constituent functions. By way of non-limiting example, individual constituent functions may comprise one or more of sinusoidal functions, wavelets, oscillatory functions, and/or other functions. For example, a set of functions of a given frequency domain representation may comprise multiple sinusoidal functions that, when summed, comprise the frequency domain representation. By way of non-limiting example, a complex-valued steerable pyramid filter and/or other decomposition techniques may be used decompose a frequency domain representation of a given frame into its set of functions that make up the frequency domain representation, described in more detail herein.

By way of non-limiting illustration in FIG. 2, the decomposition component 110 may be configured to determine a first frequency domain representation 214 of the first frame 206 based on the first information 202 describing a spatial domain representation of the first frame 206; a second frequency domain representation 216 of the second frame 208 based on the first information 202 describing spatial domain representation of the second frame 28, and/or other frequency domain representations 218 of one or more other frames 210 of the first video 204.

In some implementations, the decomposition component 110 may be configured to decompose the first frequency domain representation 214 into a first set 220 of functions, the second frequency domain representation 216 into a second set 222 of functions, and/or other frequency domain representations 218 of other frames of the video into other sets of functions. The individual functions in the set may comprise sine waves, wavelets, and/or other functions. For illustrative purposes, the individual functions of a decomposed frequency domain representation will be referred to as sinusoidal functions, however, it is noted that in other implementations the frequency domain representations may be decomposed into other types of discrete functions. By way of non-limiting example, the first set 220 may include a first sinusoidal function 224 and/or other functions 226. In some implementations, the second set 222 may include a second sinusoidal function 228 and/or other functions 230.

Returning to FIG. 1, in some implementations, the phase difference component 112 may be configured to do one or more of identify corresponding sinusoidal functions from the sets of sinusoidal functions of frames of the video; determine phase differences between corresponding sinusoidal functions; and/or perform more or less operations. In some implementations, identifying corresponding sinusoidal functions may comprise identifying sinusoidal functions that share one or more common aspects of their functions. Common aspects may include one or more of frequency, amplitude, phase, and/or other aspects of the functions. In some implementations, corresponding sinusoidal functions may be identified based on their associated frequency band that may be determined by applying a complex-valued steerable pyramid filter and/or other decomposition techniques.

In some implementations, the phase difference component 112 may be configured to determine phase differences between corresponding sinusoidal functions, phase "shifts" between corresponding sinusoidal functions, and/or other information. In some implementations, determining phase differences may include one or more of determining individual phases of individual corresponding sinusoidal functions, determining a difference between the phases, and/or other operations. In some implementations, determining a phase shift may include scaling a phase difference by a scale factor. By way of non-limiting example, the following illustrates one or more techniques to determine one or more of a phase difference, a phase shift, and/or other information associated with corresponding sinusoidal functions.

Figure 3:
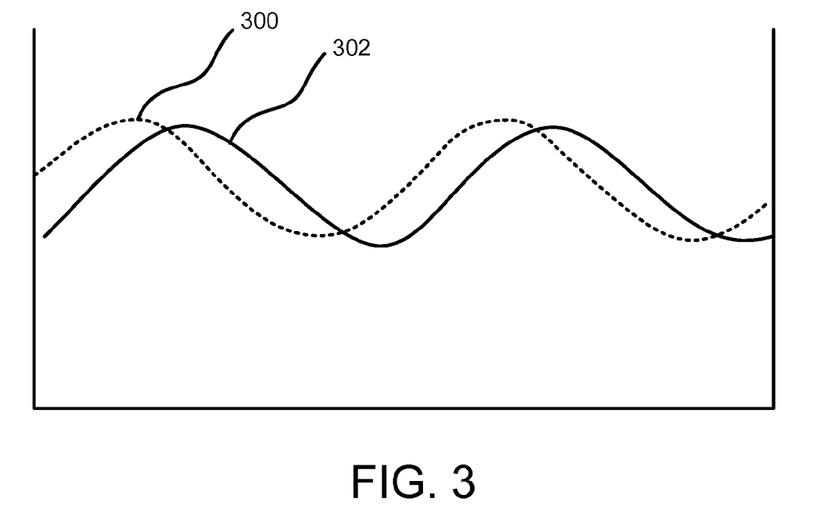
FIG. 3 illustrates a phase difference between corresponding simple sinusoidal functions, in accordance with one or more implementations.

Referring now to FIG. 3, a sinusoidal function 300 is shown by the dashed line. The sinusoidal function 300 may be defined as y=A sin(ωx−ϕ); where A is the amplitude; ω is the angular frequency; and ϕ is the phase. A translation of this function can be described by modifying the phase, e.g. by subtracting π/4 (or other amount) from the phase. A translated function 302 is shown by the solid line. A phase shift, denoted as $\phi_{shift}$, may correspond to a spatial displacement between the sinusoidal function 300 and the translated function 302. The phase shift may comprise the phase difference, denoted as $\phi_{diff}$, between the two phases of the sinusoidal function 300 and the translated function 302 scaled by ω, such that:

$$\phi_{shift} = \frac{\phi_{diff}}{\omega}.$$

Other techniques for determining phase difference and/or phase shifts based on more complex functions are presented in more detail herein.

By way of non-limiting illustration in FIG. 2, the phase difference component 112 may be configured to identify corresponding sinusoidal functions from the first set, second set, so other sets. For example, the first sinusoidal function 224 may be identified as corresponding to the second sinusoidal function 228. The phase difference component 112 may be configured to identify a first phase of the first sinusoidal function 224, a second phase of the second sinusoidal function 228, and/or other phases of other functions 226 and/or 230. The phase difference component 112 may be configured to determine a first phase difference 232 between the first sinusoidal function 224 and the second sinusoidal function 228, and/or other phase differences 234 between other corresponding functions of the first set 220 and second set 222. For example, the first phase difference 232 may comprise the second phase of the second sinusoidal function 228 subtracted from the first phase of the first sinusoidal function 224.

Returning to FIG. 1, in some implementations, the function interpolation component 114 may be configured to interpolate sinusoidal functions for the corresponding sinusoidal functions based on the determined phased differences and/or other information. By way of non-limiting example, the following illustrates one or more techniques to determine interpolated functions based on a phase difference and/or other information.

In some implementations, a phase difference may be modified according to a weight value, $\alpha \in (0,1)$. The weight value may relate to an intermediate position between corresponding functions:

$$y = A\,\sin(\omega x - \alpha \phi_{\mathit{diff}}) = A\,\sin(\omega(x - \alpha \phi_{\mathit{shift}})).$$

Figure 4:
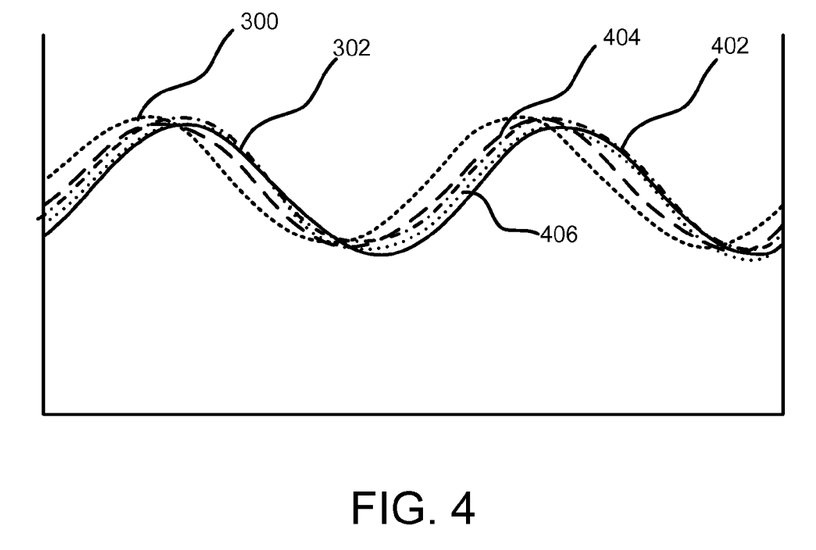
FIG. 4 illustrates interpolating a sinusoidal function between corresponding simple sinusoidal functions based on a determined phase difference, in accordance with one or more implementations.

The resulting function may correspond to an intermediate (e.g., interpolated) sinusoid. By way of non-limiting example, FIG. 4 illustrates a first interpolated function 402 (represented by the dash-dot-dash line), a second interpolated function 404 (represented by the long dash line), and a third interpolated function 406 (represented by the dotted line), that individually correspond to different values for $\alpha$. For example, the first interpolated function 402 may correspond to $\alpha = 0.2$; the second interpolated function 404 may correspond to $\alpha = 0.5$; and the third interpolated function 406 may correspond to a $\alpha = 0.8$.

In some implementations, the technique described above for interpolating function may be extended to a general function $f(x)$ translated by some displacement function $\delta(x)$. A translated function $f(x+\delta(x))$ may be represented in the Fourier domain as a sum of complex sinusoids over frequencies $\omega$:

$$f(x+\delta(t)) = \sum_{\omega=-\infty}^{\omega=-\infty} R_\omega(x,t),$$

where individual sinusoids may represent one band $R_\omega(x,t) = A_\omega e^{i\omega(x+\delta(t))}$. A corresponding phase $\phi_\omega = \omega(x+\delta(t))$ may be directly modified with respect to $\alpha$, leading to modified bands:

$$\hat{R}_\omega(x,t) = A_\omega e^{i\omega(x+\alpha\delta(t))}.$$

Interpolated functions may be determined by integrating the modified bands in accordance with the translated function shown above.

For multi-dimensional functions (e.g., such as those associated with the frequency domain representations of individual frames) one can separate the sinusoids into bands according to the frequency, spatial orientation, and/or by other aspects. This may be accomplished using one or more of a complex-valued steerable pyramid filter $\Psi_{\omega,\theta}$, and/or other techniques. When applied to a discrete Fourier transform of a spatial domain representation of a frame (e.g., to achieve a frequency domain representation of the frame), a steerable pyramid filter $\Psi_{\omega,\theta}$ may decompose the frequency domain representations into a set of oriented frequency bands $R_{\omega,\theta}$. The remaining frequency content which may not have been captured in the pyramid levels may be summarized in (real valued) high- and/or low-pass residuals.

In some implementations, complex-valued bands $R_{\omega,\theta}$ obtained by applying the steerable filters $\Psi_{\omega,\theta}$ to a frequency domain representation of a frame, I, may be written as:

$$R_{\omega,\theta}(x,y) = (I * \Psi_{\omega,\theta})(x,y)$$

$$= A_{\omega,\theta}(x,y) e^{i\phi_{\omega,\theta}(x,y)}$$

$$= C_{\omega,\theta}(x,y) + iS_{\omega,\theta}(x,y),$$

where $C_{\omega,\theta}$ is a cosine part, representing an even-symmetric filter response, and $S_{\omega,\theta}$ is the sine part, representing an odd-symmetric filter response. From this, amplitude may computed as $$A_{\omega,\theta}(x,y) = \sqrt{C_{\omega,\theta}(x,y)^2 + S_{\omega,\theta}(x,y)^2},$$

and the phase components may be computed as $\phi_{\omega,\theta}(x,y) = \arctan(S_{\omega,\theta}(x,y)/C_{\omega,\theta}(x,y))$.

In some implementations, based on an assumption that small motion may be encoded in a phase shift, interpolating may include the computation of a phase difference between the phases of the individual sinusoidal functions decomposed from the frequency domain representations of two input frames as:

$$\phi_{\mathit{diff}} = a\tan 2(\sin(\phi_1 - \phi_2), \cos(\phi_1 - \phi_2)),$$

where a tan 2 may comprise a four-quadrant inverse tangent. This approach may result in angular values between $[-\pi, \pi]$, which may correspond to the smaller angular different between two input sinusoidal functions. This approach may further determine a limit of motion that may be represented, which may be bounded by:

$$|\phi_{\mathit{shift}}| = \frac{|\phi_{\mathit{diff}}|}{\omega} \le \frac{\pi}{\omega},$$

where $\omega = 2\pi\nu$, with $\nu$ being the spatial frequency. In some implementations, this approach may be utilized by the phase difference component 112 to determine phase differences.

In some implementations, in a multi-scale pyramid, individual levels may represent a particular band of spatial frequencies $\nu \in [\nu_{min}, \nu_{max}]$. Assuming $\nu_{max}$ corresponds to a highest representable frequency on a given level, then a phase difference of $\pi$ may correspond to a shift of one pixel. While this may be a reasonable shift determination for low frequency content represented on the coarser pyramid levels, it may be too limiting for high frequency content to achieve realistic interpolation results in the presence of larger motions. To address this, a bounded shift correction may be applied, discussed herein.

Figure 5:
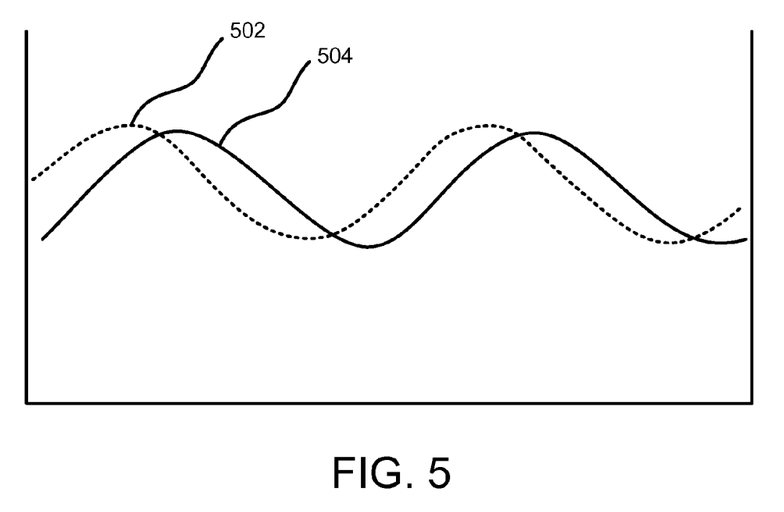
FIG. 5 illustrates a phase difference between simple sinusoidal functions, in accordance with one or more implementations.
Figure 6:
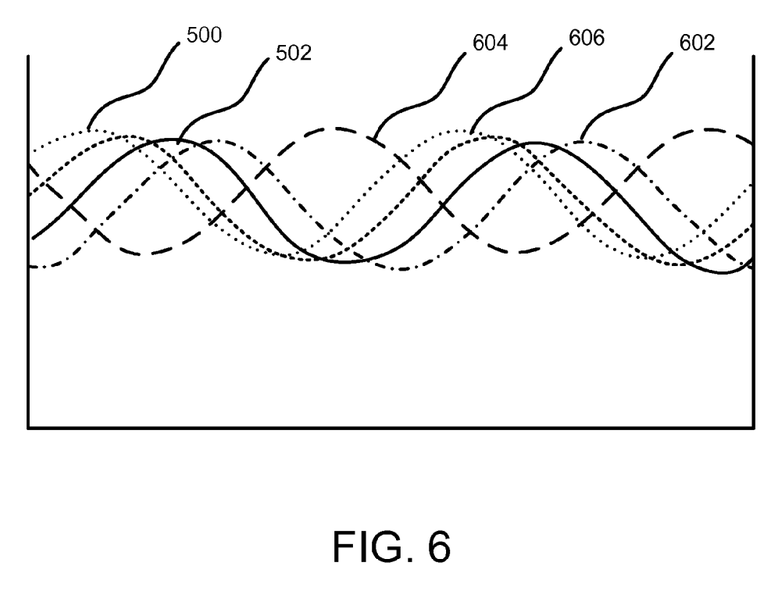
FIG. 6 illustrates a depiction of multiple sinusoidal functions that are interpolated for corresponding sinusoidal functions based on a determined phase difference, in accordance with one or more implementations.

In some implementations, large displacements corresponding to a phase difference of more than $\pi$ may lead to a phase difference ambiguity. Due to the periodicity of a phase value, a phase difference may be defined between $[-\pi, \pi]$ and may correspond to a smallest angular difference. By way of non-limiting illustration in FIG. 5, an actual spatial displacement between a sinusoidal function 502 and a translated sinusoidal function 504 may be larger than a computed phase difference as presented above, for example, by a multiple of ±2π. Although the sinusoidal functions 502, 504 may appear identical to the functions 300, 302 shown in FIG. 3, one or more intermediate interpolated sinusoids may differ depending on an assumed phase shift. By way of non-limiting example, FIG. 6 illustrates a first interpolated function 602 (represented by the dash-dot-dash line), a second interpolated function 604 (represented by the long dash line), and a third interpolated function 606 (represented by the dotted line). The interpolated functions 602, 604, and/or 606 may individually correspond to different values for a, and may exhibit the ±2π ambiguity problem. In some implementations, interpolation may be performed when the shift computed on a particular level corresponds to the true motion of the captured frequency content.

In some implementations, the ambiguity problem may be addressed by setting a phase difference at a given pyramid level, l, to two times its absolute value at the next coarser level, l+1, whenever the phase difference becomes greater than π/2. In some cases, if $$|\phi_{diff}^{l+1}| > \pi/2,$$

the corrected phase difference may be given by $$\phi_{diff}^{l} = 2\phi_{diff}^{l+1}.$$

This may define a level where the phase difference may be assumed to correctly estimate motion, and then this value may be copied to the remaining finer resolution levels, ignoring their own respective phase values. This may lead to a loss of detailed motion for high frequency content, resulting in artifacts such as ringing and/or blurring of detail in a final determined interpolated frame. A limitation to this approach may be the use of a scaling factor of two, which may be suboptimal in terms of robustness of image-based multi-scale methods.

To overcome one or more limitations of the above approach, a confidence factor for the shift correction may be provided. The confidence factor for the shift correction may take available shift information into account and/or interpolate the motion of high frequency content more robustly. This may be based on an assumption that a phase difference between two resolution levels may not differ arbitrarily, e.g., phase differences between levels may be used as a measure that quantifies whether a computed phase shift is reliable.

In some implementations, one or more approaches for interpolating functions described herein may be configured to resolve the 2π ambiguity problem based on information in a next coarser level of a steerable pyramid filter. By way of non-limiting example, if a computed phase shift on a given level differs more than a limiting threshold from a coarser level, a shift correction on the given level may be performed. To this end, multiples of ±2π may be added to $\phi_{diff}$ such that absolute differences between the phase values of a consecutive levels may not be greater than a given tolerance. In some implementations, the value w, and/or other values, may be used as a tolerance distance which may modify the phase values in such a way that the phase difference between two levels may not be greater than π and/or other value.

In some implementations, an actual shift correction may depend on the difference between two levels, which may be used to determine a confidence factor, co, as:

$$\varphi = \text{atan2}(\sin(\phi_{diff}^{l} - \lambda\phi_{diff}^{l+1}), \cos(\phi_{diff}^{l} - \lambda\phi_{diff}^{l+1})),$$

where the phase value of the coarser level is scaled according to an arbitrary pyramid scale factor λ>1 to get a scale-independent estimate. In some implementations, if $$|\varphi| > \frac{\pi}{2},$$

a shift correction may be applied to obtain a corrected phase difference as $$\tilde{\phi}_{diff}^{l} = \lambda\phi_{diff}^{l+1}.$$

This approach may produce considerably higher quality interpolation results compared to a simpler correction based on absolute values.

While this shift correction technique may allow larger motions to be modeled, there may still be a limit to the motion that may be represented without introducing blurring artifacts in final interpolated frames. A solution may be the addition of an enhancement, which may limit the admissible phase shifts to well representable motions. To this end, a given phase difference may be limited by a constant $\phi_{limit}$. If the phase difference is above this limit, e.g., $$|\phi_{diff}^{l}| > \phi_{limit},$$

the phase difference value from the next courser level may be used at the corrected phase difference:

$$\tilde{\phi}_{diff}^{l} = \lambda\phi_{diff}^{l+1}.$$

In some implementations, an admissible limit $\phi_{limit}$ may be defined depending on a current level, the total number of levels "L," the scale factor λ, and/or other information, as:

$$\phi_{limit} = \tau\pi\lambda^{L-l},$$

where the parameter τ∈(0,1) may determine a percentage of limitation. On a coarsest level, the corrected phase difference may be set to zero if it's magnitude exceeds $\phi_{limit}$.

By way of non-limiting illustration, the function interpolation component 114 may be configured to interpolate a sinusoidal function between corresponding sinusoidal functions which may individually be associated with phase $\phi_1$ and $\phi_2$, respectively. Due to a shift correction as illustrated previously, $\phi_1 + \tilde{\phi}_{diff}$ may no longer guarantee to match $\alpha_2$ and/or other equivalent multiple of $\phi_2 \pm \gamma 2\pi$, where γ∈N$_0$. In order for a resulting images to be smoothly interpolated, we may preserve the phases up to the 2π ambiguity, while still respecting the shift corrected phase difference $\tilde{\phi}_{diff}$. This may be accomplished by searching for a phase difference $\hat{\phi}_{diff}$ that may be ±γ2π an initially computed phase difference $\phi_{diff}$ (see above), such that:

$$\hat{\phi}_{diff} = \phi_{diff} + \gamma^* 2\pi$$

where γ* may be determined as:

$$\gamma^* = \underset{\gamma}{\operatorname{argmin}}\{(\tilde{\phi}_{diff} - (\phi_{diff} + \gamma 2\pi))^2\}.$$

In some implementations, this and/or other approaches may be utilized by the phase difference component 112.

Due to the adjustment we can now compute the phase $\phi_\alpha$ of an interpolated sinusoidal function based on the phase of one input frame and a fraction of the final phase differences $\hat{\phi}_{diff}$ as:

$$\phi_\alpha = \phi_1 + \alpha \hat{\phi}_{diff}.$$

In some implementations, the function interpolation component 114 may be configured to determine amplitudes of interpolated sinusoidal functions, low frequency residuals, and/or other information. In some implementations, determining amplitude may be based on one or more of a linear blend of the amplitudes of the corresponding sinusoidal functions, a linear blend of the low frequency residual, and/or other information. On coarse resolutions these quantities may correspond to a global luminance difference between the input frames. Linear blending may reduce visible artifacts in the final interpolated frames.

By way of non-limiting illustration, a linear blend, $A_\alpha$, of two amplitudes $A_1$, $A_2$, of corresponding sinusoidal functions may be computed as:

$$A_\alpha = (1-\alpha)^* A_1 + \alpha A_2.$$

In some implementations, a same or similar linear blending technique may be employed to determine a linear blend of corresponding low frequency residuals.

By way of non-limiting illustration in FIG. 2, the function interpolation component 114 may be configured to interpolate a third sinusoidal function 236 corresponding to the first sinusoidal function 224 and the second sinusoidal function 228 based on the first phase difference 232 and/or other information. The function interpolation component 114 may be configured to interpolate other functions 238. The function interpolation component 114 may be configured such that determining the third sinusoidal function 236 comprises one or more of adjusting the first phase difference 232 based on a 2π ambiguity, a confidence factor, a limit on an admissible phase, and/or other information. The function interpolation component 114 may be configured such that a phase of the third sinusoidal function 236 may be determined based on the adjusted first phase difference 232. The function interpolation component 114 may be configured such that determining the phase of the third sinusoidal function 236 based on the adjusted first phase difference 232 comprises one or more of adding a fraction of the adjusted first phase difference 232 to the value of the phase of the first sinusoidal function 224 (and/or subtracting a fraction of the adjusted first phase difference 232 from the value of the phase of the second sinusoidal function 228).

In some implementations, the function interpolation component 114 may be configured to determine an amplitude of the third sinusoidal function 236 based on amplitudes of the corresponding first sinusoidal function 224 and second sinusoidal function 228. By way of non-limiting example, the function interpolation component 114 may be configured to identify a first amplitude of the first sinusoidal function 224, a second amplitude of the second sinusoidal function 228, and/or other amplitudes of other corresponding sinusoidal functions of the first set 220 and/or second set 222. In some implementations, the amplitude of the third sinusoidal function 236 may be determined based on a blending of the first amplitude and second amplitude, and/or other techniques. In some implementations, a blending of the first amplitude and the second amplitude may comprise a linear blending. The function interpolation component 114 may be configured to determine a blending of low frequency residuals of the first sinusoidal function 224 and second sinusoidal function 228. The blending may comprise a linear blending.

Returning to FIG. 1, in some implementations, the frame interpolation component 116 may be configured to determine information describing spatial domain representations of interpolated frames based on the interpolated sinusoidal functions. In some implementations, determining information describing spatial domain representations of interpolated frames may comprise one or more of combining interpolated sinusoidal functions into a frequency domain representation, transforming the frequency domain representation into a spatial domain representation, and/or other operations. In some implementations, combining interpolated sinusoidal functions into a frequency domain representation may comprise summing the interpolated sinusoidal functions into a Fourier series, and/or other techniques. In some implementations, transforming the frequency domain representations to spatial domain representations may be based on one or more of an inverse Fourier transformation, and/or other techniques.

By way of non-limiting example, the frame interpolation component 116 may be configured such that second information 240 describing spatial domain representations of a third frame 242 and/or other interpolated frames 244 may be determined. In some implementations, the third frame 242 may correspond to an interpolated frame between the first frame 206 and the second frame 208 of the first video 204. For example, the second information 240 describing a spatial domain representation of the third frame 242 may be determined based on the third sinusoidal function 236 and/or other interpolated sinusoidal function of corresponding functions of the first set 220 and second set 222. In some implementations, responsive to the function interpolation component 114 interpolating other sinusoidal functions based on other phase differences between one or more other corresponding sinusoidal functions of the first set 220 and second set 222, the frame interpolation component 116 may be configured to determine the second information 240 that describes spatial domain representations of the third frame 242 based on a combination of the third sinusoidal function 236 and the one or more other interpolated sinusoidal functions.

Returning to FIG. 1, in some implementations, the video component 108 may be configured to update the information describing spatial domain representations of frames of a given video to include determined spatial domain information corresponding to one or more interpolated frames.

By way of non-limiting illustration in FIG. 2, the video component 108 may be configured to update the first information 202 based on the second information 240. For example, the first information 202 may be updated to include information describing a spatial domain representation of the third frame 242. The first information 202 may be updated to included information describing spatial domain representation of other interpolated frames.

Returning to FIG. 1, the presentation component 118 may be configured to effectuate presentation of a given video on a computing platform 122 based on updated information describing spatial domain representations of the original frames and/or interpolated frames of the video. By way of non-limiting example, the updated information may represent a relatively higher frame rate version of a given video compared to the information initially obtained by the video component 108.

The server 102, computing platforms 122, and/or external resources 124 may be operatively linked via one or more electronic communication links. For example, such electronic communication links may be established, at least in part, via a network 121 such as the Internet and/or other networks. It will be appreciated that this is not intended to be limiting and that the scope of this disclosure includes implementations in which server 102, computing platforms 122, and/or external resources 124 may be operatively linked via some other communication media.

The external resources 124 may include sources of information, hosts, and/or providers of virtual spaces outside of system 100, external entities participating with system 100, external entities for player-to-player communications, and/or other resources. In some implementations, some or all of the functionality attributed herein to external resources 124 may be provided by resources included in system 100.

The server 102 may include electronic storage 119, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 119 may comprise electronic storage media that electronically stores information. The electronic storage media of electronic storage 119 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). Electronic storage 119 may store software algorithms, information determined by processor 104, information received from server 102, information received from computing platforms 122, and/or other information that enables server 102 to function as described herein.

Processor(s) 104 is configured to provide information-processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 108, 110, 112, 114, 116, and/or 118. Processor 104 may be configured to execute components 108, 110, 112, 114, 116, and/or 118 by software; hardware; firmware; some combination of software, hardware, and/or firmware; and/or other mechanisms for configuring processing capabilities on processor 104.

It should be appreciated that although components 108, 110, 112, 114, 116, and/or 118 are illustrated in FIG. 1 as being co-located within a single processing unit, in implementations in which processor 104 includes multiple processing units, one or more of components 108, 110, 112, 114, 116, and/or 118 may be located remotely from the other components. The description of the functionality provided by the different components 108, 110, 112, 114, 116, and/or 118 described above is for illustrative purposes and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, 118, and/or other components. As another example, processor 104 may be configured to execute one or more additional components that may perform some or all of the functionality attributed below to one of components 108, 110, 112, 114, 116, and/or 118.

Figure 7:
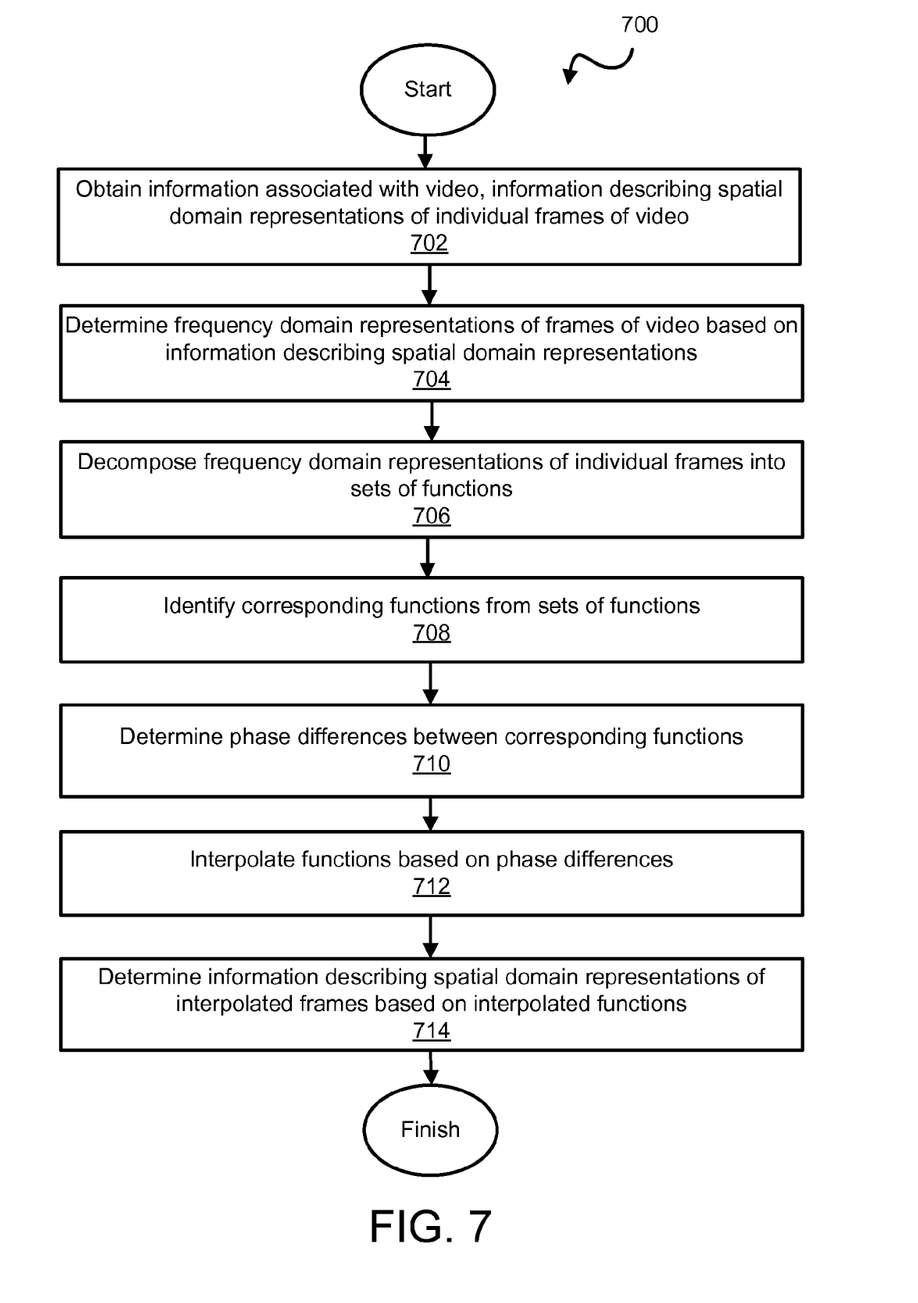
FIG. 7 illustrates a method of interpolating frames of a video, in accordance with one or more implementations.

FIG. 7 illustrates a method 700 of interpolating frames of a video, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on electronic storage medium. The one or more processing devices may include one or more devices configured through hardware, firmware, and/or software to be specifically designed for execution of one or more of the operations of method 700.

At an operation 702, information associated with a video may be obtained. The information may describe spatial domain representations of individual frames of the video. The frames of the video may include a first frame, a second frame, and/or other frames. In some implementations, operation 702 may be performed by one or more physical processors executing a video component the same as or similar to video component 108 (shown in FIG. 1 and described herein).

At an operation 704, frequency domain representations of individual frames of the video may be determined. For example, a first frequency domain representation of the first frame may be determined from the information describing the spatial domain representation of the first frame, a second frequency domain representation of the second frame may be determined from the information describing the spatial domain representation of the second frame, and/or other frequency domain representations of other frames may be determined. In some implementations, operation 704 may be performed by one or more physical processors executing a decomposition component the same as or similar to the decomposition component 110 (shown in FIG. 1 and described herein).

At an operation 706, the frequency domain representations of individual frames may be decomposed into sets of functions, such as sinusoidal functions. For example, the first frequency domain representation may be decomposed into a first set of sinusoidal functions, the second frequency domain representation may be decomposed into a second set of sinusoidal functions, and/or other frequency domain representations may be decomposed into other sets of functions. By way of non-limiting example, the first set may include a first sinusoidal function and/or other functions. The second set may include a second sinusoidal function and/or other functions. In some implementations, operation 706 may be performed by one or more physical processors executing a decomposition component the same as or similar to the decomposition component 110 (shown in FIG. 1 and described herein).

At an operation 708, corresponding functions from the sets of functions may be identified. For example, corresponding sinusoidal functions from the first set and the second set may be identified. By way of non-limiting example, the first sinusoidal function may be identified as corresponding to the second sinusoidal function. In some implementations, operation 708 may be performed by one or more physical processors executing a phase difference component the same as or similar to the phase difference component 112 (shown in FIG. 1 and described herein).

At an operation 710, phase differences between corresponding functions of the sets of functions may be determined. For example, phase differences between corresponding sinusoidal functions of the first set and second set may be determined. By way of non-limiting example, a first phase difference between the first sinusoidal function and the second sinusoidal function may be determined. In some implementations, operation 710 may be performed by one or more physical processors executing a phase difference component the same as or similar to the phase difference component 112 (shown in FIG. 1 and described herein).

At an operation 712, functions may be interpolated for the corresponding functions based on the determined phased differences. By way of non-limiting example, a third sinusoidal function may be interpolated for the first sinusoidal function and the second sinusoidal function based on the first phase difference. In some implementations, operation 712 may be performed by one or more physical processors executing a function interpolation component the same as or similar to the function interpolation component 114 (shown in FIG. 1 and described herein).

At an operation 714, information describing spatial domain representations of interpolated frames may be determined based on the interpolated functions. By way of non-limiting example, information describing a spatial domain representation of a third frame may be determined based on the third sinusoidal function and/or other interpolated sinusoidal functions. The third frame may correspond to an interpolated frame between the first frame and second frame. In some implementations, operation 714 may be performed by one or more physical processors executing a frame interpolation component the same as or similar to the frame interpolation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for interpolating frames of a video, the system comprising:
   one or more physical processors configured by machine-readable instructions to:
      obtain decompositions of a first frequency domain representation of a first frame of a video and a second frequency domain representation of a second frame of the video, the decomposition of the first frequency domain representation comprising a first set of sinusoidal functions, the decomposition of the second frequency domain representation comprising a second set of sinusoidal functions, the first set including a first sinusoidal function, and the second set including a second sinusoidal function;
      determine phase differences between corresponding sinusoidal functions of the first set of sinusoidal functions and second set of sinusoidal functions, such that based on the first sinusoidal function corresponding to the second sinusoidal function, a first phase difference is determined between the first sinusoidal function and the second sinusoidal function;
      interpolate sinusoidal functions for the corresponding sinusoidal functions based on the determined phase differences, the interpolation of sinusoidal functions comprising determining phases for individual interpolated sinusoidal functions, such that a third sinusoidal function is interpolated based on the first phase difference, the interpolation of the third sinusoidal function comprising determining a first phase of the third sinusoidal function by:
         adjusting the first phase difference based on one or more of a $2\pi$ ambiguity, a confidence factor, or a limiting threshold; and
         determining the first phase based on the adjusted first phase difference and one or both of a second phase of the first sinusoidal function or a third phase of the second sinusoidal function; and
      determine information describing spatial domain representations of interpolated frames based on the interpolated sinusoidal functions, such that information describing a spatial domain representation of a third frame is determined based on the third sinusoidal function, the third frame corresponding to an interpolated frame between the first frame and second frame.

2. The system of claim 1, wherein the one or more physical processors are further configured by machine-readable instructions such that interpolation of sinusoidal functions further comprising determining amplitudes of the interpolated sinusoidal functions, the amplitude of a given interpolated sinusoidal function being determined based on amplitudes of the corresponding sinusoidal functions included in the first set and second set, such that responsive to identifying a first amplitude of the first sinusoidal function and a second amplitude of the second sinusoidal functions, a third amplitude of the third sinusoidal function is determined based on the first amplitude and second amplitude.

3. The system of claim 2, wherein the one or more physical processors are further configured by machine-readable instructions such that the third amplitude is determined based on a blending of the first amplitude and second amplitude.

4. The system of claim 3, wherein the one or more physical processors are further configured by machine-readable instructions such that the blending of the first amplitude and the second amplitude comprises a linear blending.

5. The system of claim 1, wherein the one or more physical processors are further configured by machine-readable instructions such that determining the first phase based on the adjusted first phase difference comprises adding a fraction of the adjusted first phase difference to the value of the second phase of the first sinusoidal function.

6. The system of claim 1, wherein the one or more physical processors are further configured by machine-readable instructions to:
combine interpolated sinusoidal functions; and
determine the information that describes spatial domain representations of the interpolated frames based on the combined sinusoidal functions, such that responsive interpolating other sinusoidal functions based on other phase shifts between other corresponding sinusoidal functions of the first set and second set, determine the information that describes spatial domain representations of the third frame based on a combination of the third sinusoidal function and the other interpolated sinusoidal functions.

7. The system of claim 1, wherein the one or more physical processors are further configured by machine-readable instructions such that determining the first phase difference comprises identifying a first phase of the first sinusoidal function and a second phase of the second sinusoidal function.

8. The system of claim 1, wherein the one or more physical processors are further configured by machine-readable instructions to:
update the information describing spatial domain representations of individual frames of the video based on the information describing the spatial domain representation of the third frame such that that third frame is added to the frames of the video between the first frame and second frame.

9. The system of claim 1, wherein the one or more physical processors are further configured by machine-readable instructions such that individual sinusoidal functions comprise a wavelet.

10. The system of claim 1, wherein the one or more physical processors are further configured by machine-readable instructions such that obtaining decompositions of the first frequency domain representation of the first frame of a video and the second frequency domain representation of the second frame of the video comprises:
obtaining information associated with the video, the information describing spatial domain representations of the first frame and second frame of the video;
determining the first frequency domain representation of the first frame from the information describing the spatial domain representation of the first frame, and the second frequency domain representation of the second frame from the information describing the spatial domain representation of the second frame; and
decomposing the first frequency domain representation into the first set of sinusoidal functions and the second frequency domain representation into the second set of sinusoidal functions using a complex-valued steerable pyramid filter.

11. A method of interpolating frames of a video, the method being implemented in a computer system including one or more physical processors and storage media storing machine-readable instructions, the method comprising:
obtaining decompositions of a first frequency domain representation of a first frame of a video and a second frequency domain representation of a second frame of the video, the decomposition of the first frequency domain representation comprising a first set of sinusoidal functions, the decomposition of the second frequency domain representation comprising a second set of sinusoidal functions, the first set including a first sinusoidal function, and the second set including a second sinusoidal function;
determining phase differences between corresponding sinusoidal functions of the first set of sinusoidal functions and second set of sinusoidal functions, including based on the first sinusoidal function corresponding to the second sinusoidal function, determining a first phase difference between the first sinusoidal function and the second sinusoidal function;
interpolating sinusoidal functions for the corresponding sinusoidal functions based on the determined phase differences, the interpolation of sinusoidal functions comprising determining phases for individual interpolated sinusoidal functions, including interpolating a third sinusoidal function based on the first phase difference, the interpolation of the third sinusoidal function comprising determining a first phase of the third sinusoidal function by:
adjusting the first phase difference based on one or more of a $2\pi$ ambiguity, a confidence factor, or a limiting threshold; and
determining the first phase based on the adjusted first phase difference and one or both of a second phase of the first sinusoidal function or a third phase of the second sinusoidal function; and
determining information describing spatial domain representations of interpolated frames based on the interpolated sinusoidal functions, including determining information describing a spatial domain representation of a third frame based on the third sinusoidal function, the third frame corresponding to an interpolated frame between the first frame and second frame.

12. The method of claim 11, wherein interpolating sinusoidal functions further comprising determining amplitudes of the interpolated sinusoidal functions, the amplitude of a given interpolated sinusoidal function being determined based on amplitudes of the corresponding sinusoidal functions included in the first set and second set, including responsive to identifying a first amplitude of the first sinusoidal function and a second amplitude of the second sinusoidal functions, determining a third amplitude of the third sinusoidal function based on the first amplitude and second amplitude.

13. The method of claim 12, wherein the third amplitude is determined based on a blending of the first amplitude and second amplitude.

14. The method of claim 13, wherein the blending of the first amplitude and the second amplitude comprises a linear blending.

15. The method of claim 11, wherein determining the first phase based on the adjusted first phase difference comprises adding a fraction of the adjusted first phase difference to the value of the second phase of the first sinusoidal function.

16. The method of claim 11, further comprising:
combining interpolated sinusoidal functions; and
determining the information that describes spatial domain representations of the interpolated frames based on the combined sinusoidal functions, such that responsive to interpolating other sinusoidal functions based on other phase shifts between other corresponding sinusoidal functions of the first set and second set, determining the information that describes spatial domain representations of the third frame based on a combination of the third sinusoidal function and the other interpolated sinusoidal functions.

17. The method of claim 11, wherein determining the first phase difference comprises identifying a first phase of the first sinusoidal function and a second phase of the second sinusoidal function.

18. The method of claim 11, further comprising:
updating the information describing spatial domain representations of individual frames of the video based on the information describing the spatial domain representation of the third frame such that that third frame is added to the frames of the video between the first frame and second frame.

19. The method of claim 11, wherein individual sinusoidal functions comprise a wavelet.

20. The method of claim 11, wherein obtaining decompositions of the first frequency domain representation of the first frame of a video and the second frequency domain representation of the second frame of the video comprises:
obtaining information associated with the video, the information describing spatial domain representations of the first frame and second frame of the video;
determining the first frequency domain representation of the first frame from the information describing the spatial domain representation of the first frame, and the second frequency domain representation of the second frame from the information describing the spatial domain representation of the second frame; and
decomposing the first frequency domain representation into the first set of sinusoidal functions and the second frequency domain representation into the second set of sinusoidal functions using a complex-valued steerable pyramid filter.

\* \* \* \* \*